United States Patent
Lazar et al.

(10) Patent No.: US 7,852,858 B2
(45) Date of Patent: Dec. 14, 2010

(54) METHOD AND DEVICE FOR COMMUNICATION BETWEEN MULTIPLE SOCKETS

(75) Inventors: Marius Lazar, St. Rémy l'Hourrie (FR); Thomas Froment, Longpont sur Orge (FR)

(73) Assignee: Alcatel Lucent, Paris (FR)

(*) Notice: Subject to any disclaimer, the term of this patent is extended or adjusted under 35 U.S.C. 154(b) by 220 days.

(21) Appl. No.: 12/314,652

(22) Filed: Dec. 15, 2008

(65) Prior Publication Data

US 2009/0310611 A1    Dec. 17, 2009

(30) Foreign Application Priority Data

Dec. 18, 2007   (FR)   ................................. 07 59931

(51) Int. Cl.
    *H04L 12/28* (2006.01)
(52) U.S. Cl. .................. 370/395.7; 370/412; 710/5; 709/228
(58) Field of Classification Search ................ 370/389, 370/395.7, 395.71, 395.72; 710/5; 709/227, 709/228

See application file for complete search history.

(56) References Cited

U.S. PATENT DOCUMENTS

| | | | | |
|---|---|---|---|---|
| 6,073,177 A * | 6/2000 | Hebel et al. | ................. | 709/228 |
| 6,138,186 A * | 10/2000 | Simms et al. | ................. | 710/52 |
| 6,922,727 B2 * | 7/2005 | Banerjee | .................... | 709/227 |
| 7,181,525 B1 * | 2/2007 | Hebel et al. | ................. | 709/228 |
| 7,206,864 B2 * | 4/2007 | Enko et al. | ................... | 709/249 |
| 7,269,661 B2 * | 9/2007 | Ree et al. | .................... | 709/230 |
| 7,430,623 B2 * | 9/2008 | Walls et al. | ................... | 710/52 |
| 7,751,346 B2 * | 7/2010 | Park et al. | .................... | 370/256 |
| 7,769,905 B1 * | 8/2010 | Chu et al. | ................... | 709/250 |
| 2007/0088854 A1 * | 4/2007 | Park et al. | ................... | 709/250 |
| 2009/0116503 A1 * | 5/2009 | Sebastian | .................... | 370/412 |
| 2009/0240780 A1 * | 9/2009 | Brown et al. | ................ | 709/206 |

OTHER PUBLICATIONS

Mohamed et al, Self-Configuration Techniques for MuniSocket, 2007, pp. 11-20, Ieee.*

* cited by examiner

*Primary Examiner*—Ayaz R Sheikh
*Assistant Examiner*—Mounir Moutaouakil
(74) *Attorney, Agent, or Firm*—Harness, Dickey & Pierce

(57) ABSTRACT

One (SC3) of the sockets (SC) is designated to be capable of receiving the data stream received by each socket associated with a selected process, Said socket thereby designated (SC3) further comprises an additional receive list (RXS) listing buffer memories containing the data stream received by all of the sockets involved in a selected process. The buffer memories (SKB) of each socket (SC1, SC2, SC3) simultaneously belong to both receive lists (RX, RXS), and each further comprise an additional "previous" pointer (PPS) indicating the buffer memory which precedes the current buffer memory in the additional receive list (RXS), and an additional "next" pointer (PSS) indicating the buffer memory which follows the current buffer memory in the additional receive list (RXS), which makes it possible to access the data stream received by the set of sockets involved in said process, in the order in which said received data stream arrived.

2 Claims, 1 Drawing Sheet

FIG_1
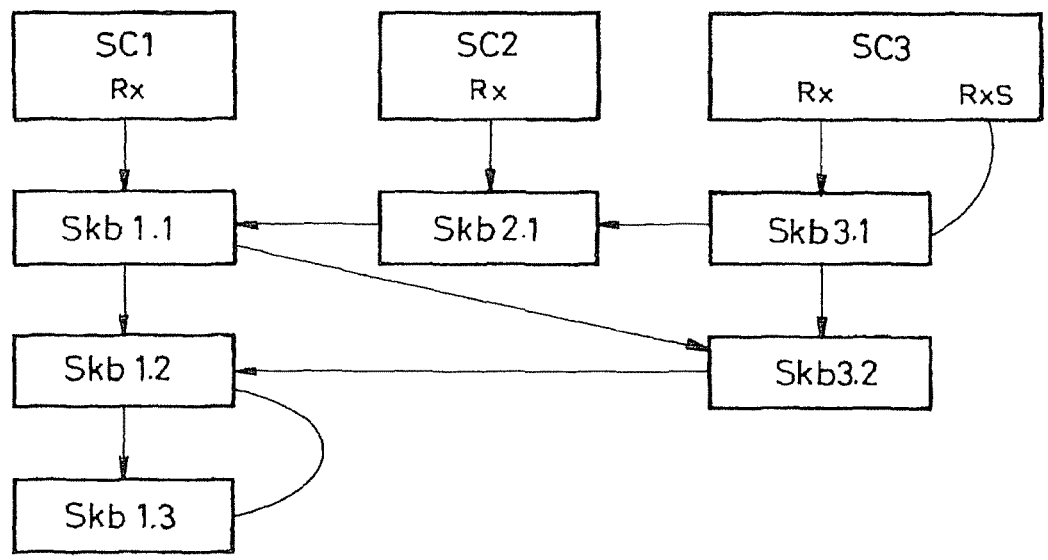
FIG_2
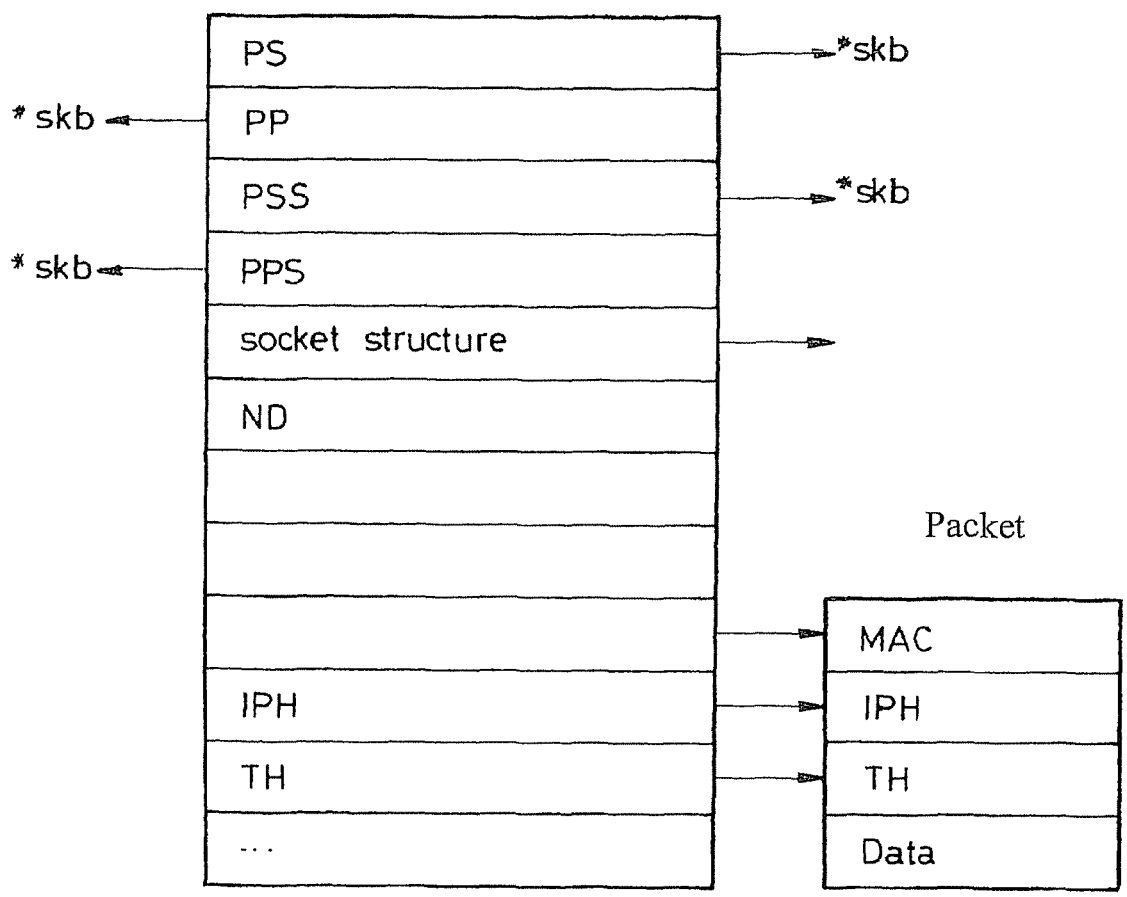

METHOD AND DEVICE FOR COMMUNICATION BETWEEN MULTIPLE SOCKETS

BACKGROUND

The invention pertains to communication between multiple sockets within a communication network.

It may be applied to any process which receives messages or data from multiple sources via Internet communication networks and which operate using protocols such as TCP ("Transport Control Protocol") or their equivalents.

Generally, a socket comprises a receive list that lists buffer memories containing the received data stream, and a send list that lists buffer memories containing the data streams to be send.

The receive lists and send lists are said to be "doubly linked" in that the buffer memories that constitute them each possess a structure comprising a "previous" pointer indicating the buffer memory that precedes the current buffer memory in the corresponding list, and a second "next" pointer indicating the buffer memory which follows the current buffer memory in the corresponding list.

With only one socket, the process may receive messages or data while waiting for them to arrive in said socket's receive list.

With multiple sockets, it is necessary to first execute a cyclical analysis of the receive lists to find the sockets which have received messages intended to be read.

Multiple known solutions, particularly those known as "select", "poll", "kqueue", and "epoll" have been proposed to implement this analysis.

These known solutions are relatively satisfactory, but do not take into account the order in which the messages arrive, and involve an additional task.

The result is a significant degradation in network performance, with this degradation growing larger the more sockets need to be read, such as with more than 1000 sockets.

SUMMARY

The invention mitigates this drawback.

It pertains to a communication device for communicating between multiple sockets within a communication network wherein each socket comprises a receive list listing the buffer memories that contain the received data stream, said buffer memories each having a structure comprising a "previous" pointer indicating the buffer memory which precedes the current buffer memory in the corresponding receive list, and a second "next" pointer indicating the buffer memory which follows the current buffer memory in the corresponding receive list.

According to one general definition of the invention, one of the sockets is designated to be capable of receiving the data stream received by each socket associated with a selected process, said socket thereby designated further comprises an additional receive list listing buffer memories containing the data stream received by all of the sockets involved in a selected process, and the buffer memories of each socket simultaneously belong to both receive lists, and each further comprise an additional "previous" pointer indicating the buffer memory which precedes the current buffer memory in the additional receive list, and an additional "next" pointer indicating the buffer memory which follows the current buffer memory in the additional receive list.

In this manner, the inventive device makes it possible for the socket thereby designated to access the data stream received by all of the sockets involved in said process, and to do so in the order in which said received data stream arrived.

The result is network performance which is superior to prior structures.

Another object of the invention is a communication method implemented by the inventive device.

BRIEF DESCRIPTION OF THE DRAWINGS

Other characteristics and advantages of the invention will become apparent by way of the detailed description below, and the drawings, in which:

FIG. 1 schematically depicts a communication device equipped with a designated socket in accordance with the invention; and FIG. 2 schematically depicts a buffer memory structure in accordance with the invention.

DETAILED DESCRIPTION

In FIG. 1, a TCP/IP messaging process is shown.

Such a process receives messages from multiple sources via a communication network which operates using the TCP protocol.

A socket SC is associated with each source; they are individually denoted SC1, SC2, and SC3.

Each socket SC comprises a receive list RX listing buffer memories SKB that contain the received data stream.

Each socket further comprises a send list (not shown) listing buffer memories that contain the data stream to send.

In FIG. 2, the structure of the receive list RX is such that each buffer memory SKB comprises a "previous" pointer PP indicating the buffer memory SKB which precedes the current buffer memory in the corresponding list, and a second "next" pointer indicating the buffer memory which follows the current buffer memory in the corresponding list.

The buffer memories are linked to one another for a selected socket.

Each buffer memory SKB identifies the structure of the device ND for which the data packet is sent or from which the data packet is received.

A buffer memory SKB is associated with each packet. The packets' headers are correctly located by means of a set of pointers TH, IPH, and MAC.

The buffer memories are linked for a given socket, and contain information such as the links to the protocol headers, and the device associated with the packet.

We refer again to FIG. 1.

The socket SC3 is designated to additionally receive the data stream received from each socket SC1, SC2, and SC3 associated with a selected process, such as the messaging process.

The socket SC3 comprises an additional receive list RXS listing buffer memories SKB containing the data streams received by the set of sockets involved in said process.

We refer again to FIG. 2.

The buffer memories SKB of each socket SC1, SC2, SC3 simultaneously belong to both receive lists RX, RXS.

The buffer memories SKB each further comprise an additional "previous" pointer PPS indicating the buffer memory that precedes the current buffer memory in the additional receive list RXS and an additional "next" pointer PPS indicating the buffer memory which follows the current buffer memory in the additional receive list RXS.

Within the thereby designated socket SC3, it is possible to access the data stream received by the set of sockets involved in said process, and in the order in which said received data stream arrived.

This is because the additional receive list RXS contains the pointer information that makes it possible to locate the received data streams in the order that this data arrived at the various sockets.

For example, in FIG. 1, the received data streams arrive in the following order:

Skb 3.1

Skb 2.1

Skb 1.1

Skb 3.2

Skb 1.2

Skb 1.3

Using the additional receive list RXS, it is possible to access the data streams in this order, whereas when the additional receive list is absent, access is based on the rank of the socket, i.e. first socket SC1, then socket SC2, and then SC3. In such a case, the order in which the data streams are processed would be:

Skb 1.1

Skb 1.2

Skb 1.3

Skb 2.1

Skb 3.1

Skb 3.2

The invention claimed is:

1. A communication device comprising:

multiple sockets within a communication network, wherein each socket comprises a receive list listing buffer memories containing the received data stream, said receive list having a structure in which each buffer memory comprises a "previous" pointer indicating the buffer memory that precedes the current buffer memory in the corresponding receive list, and a second "next" pointer indicating the buffer memory that follows the current buffer memory in the corresponding receive list, wherein one of the sockets is designated as configured to receive the data stream received by each socket associated with a selected process, wherein said socket thereby designated further comprises an additional receive list listing buffer memories containing the data stream received by all of the sockets involved in a selected process, and wherein the buffer memories of each socket simultaneously belong to both receive lists, and each further comprise an additional "previous" pointer indicating the buffer memory which precedes the current buffer memory in the additional receive list, and an additional "next" pointer indicating the buffer memory which follows the current buffer memory in the additional receive list, which provides access to the data stream received by the set of sockets involved in said process, in the order in which said received data stream arrived.

2. A communication method comprising:

providing multiple sockets within a communication network, wherein each socket comprises a receive list listing buffer memories containing the received data stream, said receive list having a structure in which each buffer memory comprises a "previous" pointer indicating the buffer memory that precedes the current buffer memory in the corresponding receive list, and a second "next" pointer indicating the buffer memory that follows the current buffer memory in the corresponding receive list, designating one of the sockets as configured to receive the data stream received by each socket associated with a selected process, wherein said socket thereby designated further comprises an additional receive list listing buffer memories containing the data stream received by all of the sockets involved in a selected process, and wherein the buffer memories of each socket simultaneously belong to both receive lists, and each further comprise an additional "previous" pointer indicating the buffer memory which precedes the current buffer memory in the additional receive list, and an additional "next" pointer indicating the buffer memory which follows the current buffer memory in the additional receive list, which provides access to the data stream received by the set of sockets involved in said process, in the order in which said received data stream arrived.

* * * * *